Patented May 26, 1936

2,041,840

UNITED STATES PATENT OFFICE 2,041,840

PROCESS FOR HYDROGENATING SULPHUR COMPOUNDS

Wilbur Arthur Lazier, Marshallton, Del., and John Victor Vaughen, Lakewood, Ohio, assignors to E. I. du Pont de Nemours & Company, Wilmington, Del., a corporation of Delaware No Drawing. Application August 3, 1934, Serial No. 738,206

9 Claims. (Cl. 260—16)

This invention relates to the use of chromium oxide in catalytic reactions and more particularly to the use of chromium oxide for the hydrogenation of sulphur compounds such as carbon disulphide, alkyl sulphides, thioaldehydes, mercaptans and the like. The invention may be used either for the purpose of forming valuable intermediate sulphur products, or for the purpose of forming hydrogen sulphide and saturated hydrocarbons as the end products of the hydrogenation.

It has not been practical in the past to catalytically hydrogenate sulphur compounds due to the poisoning effect that these compounds have on the usual hydrogenation catalysts. Because of this sensitivity of the best catalysts to sulphur poisoning, the whole field of synthetic sulphur compounds, which may possibly be obtained by hydrogenation reactions analogous to the synthesis of methanol from carbon monoxide and hydrogen, has remained closed. Suggestions have been made to the use of certain particular catalysts for the hydrogenation of organic sulphur compounds in gases to hydrogen sulphide. These catalysts that were suggested have all been mixtures or chemical combinations containing two or more components. They may include a metal of the sixth group of the periodic system or its oxide or hydroxide with one or more metals of the first to the fifth groups or their oxides or hydroxides. However, very little information has been given covering the details of preparing these catalysts with the result that duplication of the work is not possible.

This invention has as its object the catalytic hydrogenation of organic sulphur compounds using a catalyst of one component; namely, chromium oxide. A further object is the production of synthetic organic sulphur compounds by hydrogenation methods analogous to the synthesis of methanol from water-gas. A still further object is the treatment of substances such as gases, oils, and hydrocarbons, to remove certain objectionable sulphur compounds. Other objects of the invention will appear hereinafter.

These objects are accomplished by bringing the sulphur compound and hydrogen into contact with chromium oxide. In the case of the removal of certain objectionable sulphur compounds such as organic sulphides, mercaptans, and thiophene, from gases, oils and hydrocarbons, these compounds may be destructively hydrogenated to hydrogen sulphide which may be comparatively easily removed by washing, thus providing an inexpensive purification process.

The following examples are illustrative of the invention, but are not to be considered as limiting the scope thereof:

Example I

A solution of chromium nitrate is prepared by dissolving 2.0 lbs. of commercial chromium nitrate in about 2.0 liters of boiling water. This is diluted to about 25 liters and chromium hydroxide is precipitated from the solution by adding a slight excess of ammonium hydroxide. The dark blue gelatinous precipitate is broken up and washed several times by decantation. After filtering, the material is dried at 110° C. A hard, black vitreous material is obtained which can be crushed to the desired size for immediate use in hydrogenation.

A 20 cc. sample of this catalytic material sized to 8 to 14 mesh was heated to about 480° C. in an atmosphere of hydrogen, and then a gaseous mixture containing 17% carbon disulphide and 83% hydrogen was passed over it at a rate of about 8 to 10 liters of gas per hour, while the temperature was maintained at about 480° C. The carbon disulphide was almost completely converted to methane and hydrogen sulphide.

Example II

A water-gas consisting of a mixture of carbon monoxide and hydrogen and containing undesirable traces of carbon disulphide and thiophene was passed over a catalyst prepared as described in Example I at a temperature of about 480° C. and at a space velocity of about 500 cc. of gas per cc. of catalyst per hour. The organic sulphur compounds were completely hydrogenated to hydrogen sulphide, which was readily removed by scrubbing the gas with water. In place of water for the scrubbing step, inexpensive alkaline reagents may be used.

Example III

A very active catalyst was prepared by carefully adding 200 to 250 cc. of concentrated sulphuric acid to a solution of 150 cc. of methanol in 500 cc. of water. While hot, a solution of 150 g. ammonium bichromate in 500 cc. of water was slowly added. The solution turned green, indicating reduction of the hexavalent chromium, and gaseous oxidation products of methanol were evolved. The solution, which now contained a chromium sulphate, was diluted with several volumes of water. Enough ammonium hydroxide was added to precipitate chromium hydroxide as a blue-green insoluble powder, which was then washed several times by decantation, filtered and dried.

The experiment of Example II was repeated, using this substance as a catalyst and it was found that all the organic sulphur compounds were completely hydrogenated to hydrogen sulphide.

Example IV

A quantity of petroleum distillate having the boiling range of kerosene and containing 0.5% of total sulphur was subjected to hydrogenation by passing the vaporized oil, together with a large excess of hydrogen, over an amorphous chromium oxide catalyst prepared as described in Example 1, at a temperature of 450° to 500° C. and at the rate of about 5 cc. of oil per cc. of catalyst per hour. From 80 to 90% of the total sulphur content was removed.

Example V

A quantity of commercial benzene containing a small amount of thiophene as an impurity was vaporized and passed over 50 cc. of an amorphous chromium oxide catalyst prepared as described in Example I, together with hydrogen, at a temperature of 450° to 500° C. and at the rate of about 200 cc. per hour. The thiophene was completely removed.

Example VI

A solution containing approximately 200 g. of ammonium bichromate per liter of water was treated with hydrogen sulphide until no further precipitation occurred. The product was filtered and dried. The occluded sulphur from the reaction was removed by heating the catalyst in hydrogen. A mixture of ethylene, acetylene and hydrogen sulphide was passed over the catalyst prepared in this manner, at a temperature of 350° to 500° C. The condensate contained liquid substances such as mercaptans, disulphides, thiophene, thioaldehydes, and other products containing sulphur.

Example VII

Ammonium bichromate is heated in a vacuum at 200° to 250° C. It slowly darkens and gradually evolves water, ammonia and nitrogen. After 4 to 5 hours there remains a glistening black residue which contains no ammonia and is slightly paramagnetic and stable up to 400° C. This proved to be a moderately active chromium oxide catalyst.

It should be understood that conditions other than those specified may be effectively used, and variations of the illustrated processes may be carried out in order to obtain certain desired effects. Carbon disulphide may be substituted for the hydrogen sulphide or added to the hydrogen sulphide content in Example VI, or the gas may be free of acetylene. Such variations in the composition of the incoming gas varies the composition of the valuable products obtained.

If lower temperatures are used in the carrying out of the process in Example I, various liquid products are formed as a result of the less drastic conditions.

The catalyst made in accordance with Example III is a light-blue chalky material and may be used as such, or it may be briquetted and crushed to the desired size before use.

Although we prefer to prepare the catalyst according to the directions given, other variations than those already described may be made, with practically equivalent results, and in some cases with advantages. For instance, the preparation of the catalyst in Example I is not confined to the use of chromium nitrate and ammonium hydroxide, or even to the proportions and dilutions mentioned in that example. Chromium chloride, sulphate or chrome alum may be substituted for chromium nitrate, and other substances yielding an alkaline reaction, such as sodium or potassium hydroxide, carbonate or sulphide may be used as the precipitant.

Furthermore, the preparation of the catalyst strictly according to Example III, although preferred, is not necessary. For instance, other mineral acids may be used during reduction of the chromium. Other precipitants than ammonium hydroxide, and other reducing agents than methanol, such as formaldehyde, ethanol, acetone or hydrazine, hydrogen sulphide, and many others may be used, often with advantage.

It is not necessary to confine the working range of the catalyst to the temperatures mentioned in the examples. Other temperatures from 200° to 800° C. may be used with corresponding variations in the nature of the reaction taking place. The preferred temperature range is between 300° to 500° C. Variations may also be made in the ratio of hydrogen to the various substances being hydrogenated, although the hydrogen will preferably be used in excess of the compound undergoing hydrogenation.

This invention has opened the entirely new field of synthesizing sulphur compounds that may be obtained by the hydrogenation reactions analogous to the synthesis of methanol from carbon monoxide and hydrogen and, moreover, forms an inexpensive process for the removal of certain objectionable sulphur compounds from gases, oils and hydrocarbons.

As many apparently widely different embodiments of this invention may be made without departing from the spirit and scope thereof, it is to be understood that we do not limit ourselves to the specific embodiments thereof except as defined in the appended patent claims.

We claim:

1. A process of hydrogenating sulphur compounds capable of hydrogenation which comprises bringing a gaseous mixture containing a sulphur compound capable of hydrogenation and an excess of hydrogen into contact with a hydrogenation catalyst consisting of chromium oxide at substantially atmospheric pressure.

2. A process of hydrogenating sulphur compounds capable of hydrogenation which comprises bringing a gaseous mixture containing a sulphur compound capable of hydrogenation and an excess of hydrogen into contact with a hydrogenation catalyst consisting of chromium oxide at a temperature of 200° to 800° C. and at substantially atmospheric pressure.

3. A process of hydrogenating sulphur compounds capable of hydrogenation which comprises bringing a gaseous mixture containing an organic sulphur compound capable of hydrogenation and hydrogen into contact with a hydrogenation catalyst consisting of chromium oxide at a temperature between 300° to 500° C. and at substantially atmospheric pressure.

4. The process of purifying hydrocarbons containing sulphur compounds capable of hydrogenation as an impurity, which comprises bringing a gaseous mixture containing these hydrocarbons and hydrogen into contact with a hydrogenation catalyst consisting of chromium oxide at a temperature of 300° to 500° C. and at substantially atmospheric pressure, so as to convert the sulphur compound to hydrogen sulphide, and removing the hydrogen sulphide.

5. In the process of removing sulphur compounds capable of hydrogenation from water-gas, the step which comprises bringing the water-gas contaminated with sulphur compounds capable of hydrogenation into contact with a hydrogenation catalyst consisting of chromium oxide at a temperature of 350° to 500° C. and at substantially atmospheric pressure.

6. The process of producing sulphur compounds capable of hydrogenation which comprises bringing a mixture of ethylene, acetylene, and hydrogen sulphide into contact with chromium oxide at a temperature of 300° to 500° C. and at substantially atmospheric pressure.

7. A process of hydrogenating sulphur compounds capable of hydrogenation which comprises bringing a gaseous mixture, consisting of carbon bisulphide and hydrogen, into contact with a hydrogenation catalyst consisting of chromium oxide at a space velocity of 400 to 500 cc. of gases per cc. of catalyst per hour, and at substantially atmospheric pressure at a temperature of 480° C.

8. A process which comprises forming an aqueous chromium nitrate solution, precipitating chromium hydroxide as a gelatinous precipitate from the solution by the addition of an alkali, separating the precipitate from the solution and drying same at about 100° C. to obtain a black vitreous material, bringing a gaseous mixture comprising a sulphur compound and hydrogen into contact with the black vitreous material at a temperature between 300° to 500° C., and recovering the hydrogenated sulphur compounds formed.

9. A process which comprises dissolving two pounds of chromium nitrate in 2 liters of boiling water, diluting the solution to 25 liters, adding ammonium hydroxide in slight excess to precipitate chromium hydroxide as a dark blue gelatinous precipitate, breaking up the precipitate and washing same by decantation, drying the washed precipitate at 100° C. to obtain a hard black vitreous chromium oxide catalyst, crushing said catalyst to a size of about 8 to 14 mesh and bringing a gaseous mixture consisting of carbon bisulphide and hydrogen into contact with 20 cc. of the crushed catalyst while maintaining a temperature of about 480° C., said gases being passed over the catalyst at a space velocity of about 400 to 500 cc. of gas per cc. of catalyst per hour, recovering the methane and hydrogen sulphide formed.

WILBUR ARTHUR LAZIER.
JOHN VICTOR VAUGHEN.